United States Patent Office 3,449,501
Patented June 10, 1969

3,449,501
METHOD OF TREATING SYMPTOMS OF PAIN AND INFLAMMATION
Allen D. Rudzik, Kalamazoo, Mich., assignor to The Dow Chemical Company, Midland, Mich., a corporation of Delaware
No Drawing. Filed July 26, 1967, Ser. No. 656,055
Int. Cl. A61k 27/00
U.S. Cl. 424—273                                5 Claims

ABSTRACT OF THE DISCLOSURE

Method of treating symptoms of pain and inflammation comprising administering internally to an animal suffering such symptoms an effective amount of 2-(2,6-dichlorobenzyl)-2-imidazoline or a pharmaceutically-acceptable salt thereof.

---

This invention relates to dichlorobenzylimidazoline compounds. More particularly, the invention is directed to a novel method which comprises administering compositions containing 2-(2,6-dichlorobenzyl)-2-imidazoline or a pharmaceutically-acceptable salt thereof as the active ingredient to animals suffering symptoms of pain or inflammation, or both.

It is an object of the invention to provide a method for the relief of pain and inflammation in animals suffering such symptoms. It is another object of this invention to provide a method and compositions containing an active ingredient which has analgesic, antiinflammatory and diuretic activity. Other objects and advantages of the invention will be apparent on consideration of the following description and claims.

It has been discovered that 2-(2,6-dichlorobenzyl)-2-imidazoline and the pharmaceutically-acceptable salts thereof have significant analgesic, antiinflammatory and diuretic activity when administered to animals suffering from symptoms of pain and inflammation and, in particular, to mammals suffering such symptoms. As employed herein, the phrase "pharmaceutically-acceptable salts" refers to acid addition salts of 2-(2,6-dichlorobenzyl)-2-imidazoline, the anions of which are relatively non-toxic and innocuous to the animal at dosages consistent with good pharmacological activity so that side effects ascribable to the anions do not vitiate the beneficial effects of the free base. Suitable pharmaceutically-acceptable salts which can be employed in the method of the invention include those derived from mineral acids such as hydrochloric, hydrobromic, nitric and sulfuric acid, from organic carboxylic acids such as succinic, citric, maleic, malic and acetic acid and organic sulfonic acids such as methanesulfonic acid and toluenesulfonic acid.

The active 2-(2,6-dichlorobenzyl)-2-imidazoline compound is a crystalline solid which is soluble in a variety of organic solvents such as halobenzenes and alkylbenzenes and slightly soluble in water. The pharmaceutically-acceptable salts are crystalline solids which are soluble in water and slightly soluble in alcohols and halobenzenes. 2-(2,6-dichorobenzyl)-2-imidazoline and its pharmaceutically-acceptable salts can be prepared by the reaction of 2,6-dichlorophenylacetonitrile with ethylenediamine monotosylate according to the procedure described in U.S. Patent No. 2,919,274.

In accordance with the invention, an analgesic or antiinflammatory amount of 2-(2,6-dichlorobenzyl)-2-imidazoline or a pharmaceutically-acceptable salt thereof is administered to an animal suffering from one of the symptoms of pain and inflammation. The exact amount of the compound to be administered depends on various factors such as the size, type and age of the animal to be treated, the severity of the symptoms and whether or not the animal is suffering from one or both of such symptoms provided, however, that the animal is administered sufficient of the active compound to substantially reduce the particular symptom or combination of symptoms. Generally, the compound is administered at dosage rates from 0.2 milligram per kilogram to 50 milligrams per kilogram of animal body weight to control symptoms of pain. An antiinflammatory amount will generally be from about 25 to about 75 milligrams per kilogram of body weight administered orally. It is generally preferred to administer the compound in the form of dosage units containing from about 10 to about 500 milligrams of the active ingredient per unit.

In practicing the method of the invention, the active ingredient is preferably incorporated in a composition comprising a pharmaceutical carrier and an analgesic or antiinflammatory amount of 2-(2,6-dichlorobenzyl)-2-imidazoline or a pharmaceutically-acceptable salt thereof. In the preferred procedure, the compound is employed as a pharmaceutically-acceptable salt and 2-2,6-dichlorobenzyl)-2-imidazoline hydrochloride is the preferred salt.

In preparing the compositions for use in the method of the invention, the active ingredient is incorporated in a pharmaceutical carrier. The term "pharmaceutical carrier" refers to known pharmaceutical excipients which are substantially nontoxic and nonsensitizing. The active ingredient is preferably administered orally in the form of solid compositions which can be prepared by known techniques such as tableting and encapsulation. Suitable pharmaceutical carriers which can be employed in formulating the solid compositions include lactose, glucose, gelatin, rice flour, starch, malt, magnesium carbonate, magnesium stearate and the like and compatible mixtures thereof. The active ingredient can also be incorporated in liquid compositions for oral administration such as elixirs, syrups, emulsions and dispersions. Among the liquid pharmaceutical carriers which can be employed in preparing the liquid compositions are ethanol, propylene glycol, water, saline, glycerine, glucose syrup, syrup of acacia, mucilage of tragacanth and the like and mixtures thereof. Oil-in-water or water-in-oil emulsions are prepared with the solution of the active ingredient in an oil such as peanut oil, wheat germ oil, corn oil, olive oil or the like. Emulsions are prepared with the aid of emulsifying agents such as lecithin, sorbitan trioleate, polyoxyethylene sorbitan monooleate, gum acacia and gum tragacanth and the like. Suspensions are prepared with the aid of suspending agents such as methyl cellulose, carboxymethyl cellulose, hydroxypropylmethyl cellulose, polyethylene oxide condensation products with alkylphenols, fatty alcohols or fatty acids and the like and mixtures thereof. The compositions can also contain, in addition, sweetening agents, flavoring agents, coloring materials, preservatives and the like.

The active ingredient can also be incorporated in sterile injectable compositions for intraperitoneal or subcutaneous injection. Such compositions can be prepared with pharmaceutical carriers such as water ethanol, saline and the like and mixtures thereof.

The following examples illustrate the invention but are not to be construed as limiting the same.

EXAMPLE 1

A group of mice was administered a sterile injectable composition comprising 2-(2,6-dichlorobenzyl)-2-imidazoline hydrochloride in a 5 percent aqueous methyl cellulose suspension. The composition was administered by subcutaneous injection to provide the test compound at a dosage rate of 25 milligrams per kilogram. For purposes of comparison, a second group of mice was similarly administered 2-(2-chlorobenzyl)-2-imidazoline hydrochloride, taught by U.S. Patent No. 2,919,274 to be an adrenolytic and sympatholytic agent. The mice were subsequently challenged by the intraperitoneal injection of aqueous 0.1 percent hydrochloric acid at a dosage rate of 0.01 milliliter per gram. The mice were then placed in clear plastic cages and observed. In mice not treated with an analgesic, the intraperitoneal injection of this dosage of hydrochloric acid is followed by characteristic writhing of the mice, that is, flattening of the abdomen against the floor of the cage accompanied by rotation of the spine and pelvis. None of the mice administered 2-(2,6-dichlorobenzyl)-2-imidazoline hydrochloride were observed to writhe or exhibit other symptoms of pain. Similar results are obtained with compounds known to be useful for alleviating symptoms of pain in animals. By way of contrast, all of the mice pretreated with 25 milligrams per kilogram of 2-(2-chlorobenzyl)-2-imidazoline hydrochloride exhibited the characteristic writhing motions.

EXAMPLE 2

Separate groups of mice were orally administered one of the compounds 2-(2,6-dichlorobenzyl)-2-imidazoline hydrochloride or acetylsalicylic acid (aspirin) at various dosage rates. The mice were subsequently challenged by the intraperitoneal injection of aqueous 0.1 percent hydrochloric acid at a dosage rate of 0.01 milliliter per gram. The mice were then placed in clear plastic cages and observed for the characteristic writhing described above in Example 1. The dosage of each compound which was effective to prevent writhing in 50 percent of the mice ($ED_{50}$) was calculated. The $ED_{50}$ for 2-(2,6-dichlorobenzyl)-2-imidazoline hydrochloride was calculated to be 0.34 milligram per kilogram and the $ED_{50}$ for acetylsalicylic acid was calculated to be 89.0 milligrams per kilogram. These results indicate that 2-(2,6-dichlorobenzyl)-2-imidazoline hydrochloride is over 250 times more potent an analgesic than acetylsalicylic acid.

EXAMPLE 3

Edema was induced in two separate groups of rats by the injection of 0.05 milliliter of a 1 percent suspension of carrageenin in normal saline solution into the plantar surface of the left hind paw. The injection of this amount of carrageenin normally results in inflammation and and swelling of the paw. 0.05 milliliter of normal saline was injected into the plantar surface of the right hind paw to serve as a check. One hour after the administration of carrageenin, one group of rats was administered 2-(2,6-dichlorobenzyl)-2-imidazoline hydrochloride orally at a dosage rate of 25 milligrams per kilogram. A second group of rats was left untreated to serve as a control. Four hours after the administration of carrageenin, the hind feet of the rats were measured with a micrometer and the difference in size between the left (carrageenin-treated) foot and the right foot was attributed to carrageenin-induced edema. In the rats administered 2-(2,6-dichlorobenzyl)-2-imidazoline hydrochloride, the average size difference was found to be 67 millimeters and in the control rats, the average size difference was 88 millimeters, indicating that a substantial reduction of carrageenin-induced edema resulted from the administration of the imidazoline compound.

EXAMPLE 4

In other operations, separate groups of mice were administered 2-(2,6-dichlorobenzyl)-2-imidazoline hydrochloride at a dosage rate of 25 milligrams per kilogram. The mice were subjected to a battery of pharmacological tests to determine the presence or absence of side effect activity as, for example, sedative, anticonvulsant, muscle relaxant and antidepressant. No significant activity was observed in any such test.

In other operations, the intraperitoneal dosage of 2-(2,6-dichlorobenzyl)-2-imidazoline hydrochloride which was lethal to 50 percent of the mice tested ($LD_{50}$) was found to be 85 milligrams per kilogram.

EXAMPLE 5

Ten grams of 2-(2,6-dichlorobenzyl)-2-imidazoline hydrochloride, 63 grams of lactose, 2 grams of magnesium stearate and 35 grams of corn starch are intimately mixed together in conventional mixing apparatus. The mixture is then filled into gelatin capsules in the amount of 0.6 gram per capsule. The capsules are thus adapted to provide a dosage of 50 milligrams of the active ingredient. The capsules are adapted to be administered orally to animals suffering from symptoms of pain or inflammation.

Thirty grams of 2-(2,6-dichlorobenzyl)-2-imidazoline hydrochloride, 40 grams of lactose, 45 grams of corn starch and 5 grams of powdered gum tragacanth are intimately mixed together in a conventional mixing apparatus. The mixture is then filled into soft gelatin capsules in the amount of 1.2 grams per capsule to provide a dosage of 400 milligrams of the active ingredient per capsule. The capsules are then administered to animals suffering from symptoms of pain.

EXAMPLE 6

100 grams of 2 - (2,6 - dichlorobenzyl) - 2 - imidazoline are mixed together with 50 grams of magnesium stearate, 1.05 kilograms of maize starch and 450 grams of alginic acid in conventional mixing apparatus and the mixture is compressed into slugs. The slugs are broken into granules and passed through an eight mesh screen and mixed with an additional 50 grams of magnesium stearate. The mixture is then compressed into tablets weighing 2.5 grams each. The tablets are administered to animals suffering from symptoms of pain.

EXAMPLE 7

0.5 gram of 2 - (2,6 - dichlorobenzyl) - 2 - imidazoline, 100 parts of maize starch and 3 parts of magnesium stearate are intimately mixed together and the mixture is compressed into slugs. The slugs are broken into granules which are passed through an eight mesh screen and coated with sufficient of a solution of 15 parts of shellac and 3 parts of castor oil in 800 parts of ethanol to coat the granules. Three grams of magnesium stearate are then added to the coated granules after which they are compressed into tablets weighing 1.4 grams each. The tablets are adapted to be administered to animals suffering from symptoms of inflammation or pain.

EXAMPLE 8

Two grams of 2 - (2,6 - dichlorobenzyl) - 2 - imidazoline hydrochloride are dissolved in 500 milliliters of normal saline solution containing 0.5 percent of chlorobutanol as a preservative. The solution is filtered, filled into vials, sealed and sterilized in an autoclave to obtain a sterile injectable composition. Five cubic centimeters of the composition contain about 20 milligrams of the active ingredient. The composition is adapted to be administered to animals exhibiting symptoms of pain and inflammation.

I claim:

1. The method of treating symptoms of pain which comprises administering to an animal suffering from symptoms of pain, an analgesic amount of a member of the group consisting of 2 - (2,6 - dichlorobenzyl) - 2- imidazoline and the pharmaceutically-acceptable salts thereof.

2. The method of claim 1 wherein the compound is 2-(2,6-dichlorobenzyl)-2-imidazoline hydrochloride.

3. The method of claim 1 wherein the compound is administered at a dosage rate of between 0.2 and 50 milligrams per kilogram of animal body weight.

4. The method of treating symptoms of inflammation which comprises administering to an animal exhibiting symptoms of inflammation, an antiinflammatory amount of a member of the group consisting of 2-(2,6-dichlorobenzyl)-2-imidazoline and the pharmaceutically-acceptable salts thereof.

5. The method of claim 4 wherein the compound is 2-(2,6-dichlorobenzyl)-2-imidazoline hydrochloride.

References Cited

UNITED STATES PATENTS 2,919,274   12/1959   Faust et al. _____ 260—309.6

ALBERT T. MEYERS, *Primary Examiner.*

S. FRIEDMAN, *Assistant Examiner.*